(12) United States Patent
Smith et al.

(10) Patent No.: US 9,578,991 B2
(45) Date of Patent: Feb. 28, 2017

(54) OPEN HOLE CUTTER/GRATER

(71) Applicant: Lifetime Brands, Inc., Garden City, NY (US)

(72) Inventors: Jason Dwayne Smith, Snohomish, WA (US); Benjamin Stanley Willis, Bellvue, WA (US)

(73) Assignee: LIFETIME BRANDS, INC., Garden City, NY (US)

( * ) Notice: Subject to any disclaimer, the term of this patent is extended or adjusted under 35 U.S.C. 154(b) by 123 days.

(21) Appl. No.: 14/669,800

(22) Filed: Mar. 26, 2015

(65) Prior Publication Data
US 2015/0272396 A1 Oct. 1, 2015

Related U.S. Application Data

(60) Provisional application No. 61/970,652, filed on Mar. 26, 2014, provisional application No. 61/979,465, filed on Apr. 14, 2014.

(51) Int. Cl.
*A47J 43/25* (2006.01)

(52) U.S. Cl.
CPC ........................ *A47J 43/25* (2013.01)

(58) Field of Classification Search
CPC .................................................. A47J 43/25
USPC ..................................... 241/95, 273.1, 273.4
See application file for complete search history.

(56) References Cited

U.S. PATENT DOCUMENTS

| | | | |
|---|---|---|---|
| 3,858,815 A | | 1/1975 | Black |
| 5,083,734 A | * | 1/1992 | Ancona ................ A47J 43/25 241/101.2 |
| 6,315,224 B1 | | 11/2001 | Holcomb et al. |
| 2004/0046073 A1 | * | 3/2004 | Richardson ........... A47J 43/25 241/95 |
| 2010/0270406 A1 | | 10/2010 | Grace et al. |
| 2011/0017853 A1 | | 1/2011 | Smith et al. |
| 2011/0198233 A1 | | 8/2011 | Lin |
| 2012/0080548 A1 | | 4/2012 | Kent |
| 2012/0153062 A1 | | 6/2012 | Green et al. |
| 2013/0048769 A1 | | 2/2013 | Scharf et al. |

OTHER PUBLICATIONS

International Search Report and Written Opinion for International Application No. PCT/US2015/022750, mailed on Jul. 1, 2015. (9 pages).
RecipeTips.com,"Parmesean Grater—Definition and Cooking Information" Datasheet [online], Mar. 2012. (2 pages).

* cited by examiner

*Primary Examiner* — Mark Rosenbaum
(74) *Attorney, Agent, or Firm* — Tutunjian & Bitetto, P.C.

(57) ABSTRACT

An open hole food grater is provided. A hole is etched into the blade such that a cutting angle is formed with the plane of the cutting surface and the point at which the same meets the hole. This design of the open hole food grater not only increases the efficiency of food grating by allowing the use of the same in two cutting directions, it also eliminates all protrusions from the plane of the cutting surface. This substantially reduces any chance of a user being cut by coming into contact with the plan of the food cutting surface of the grater.

19 Claims, 13 Drawing Sheets

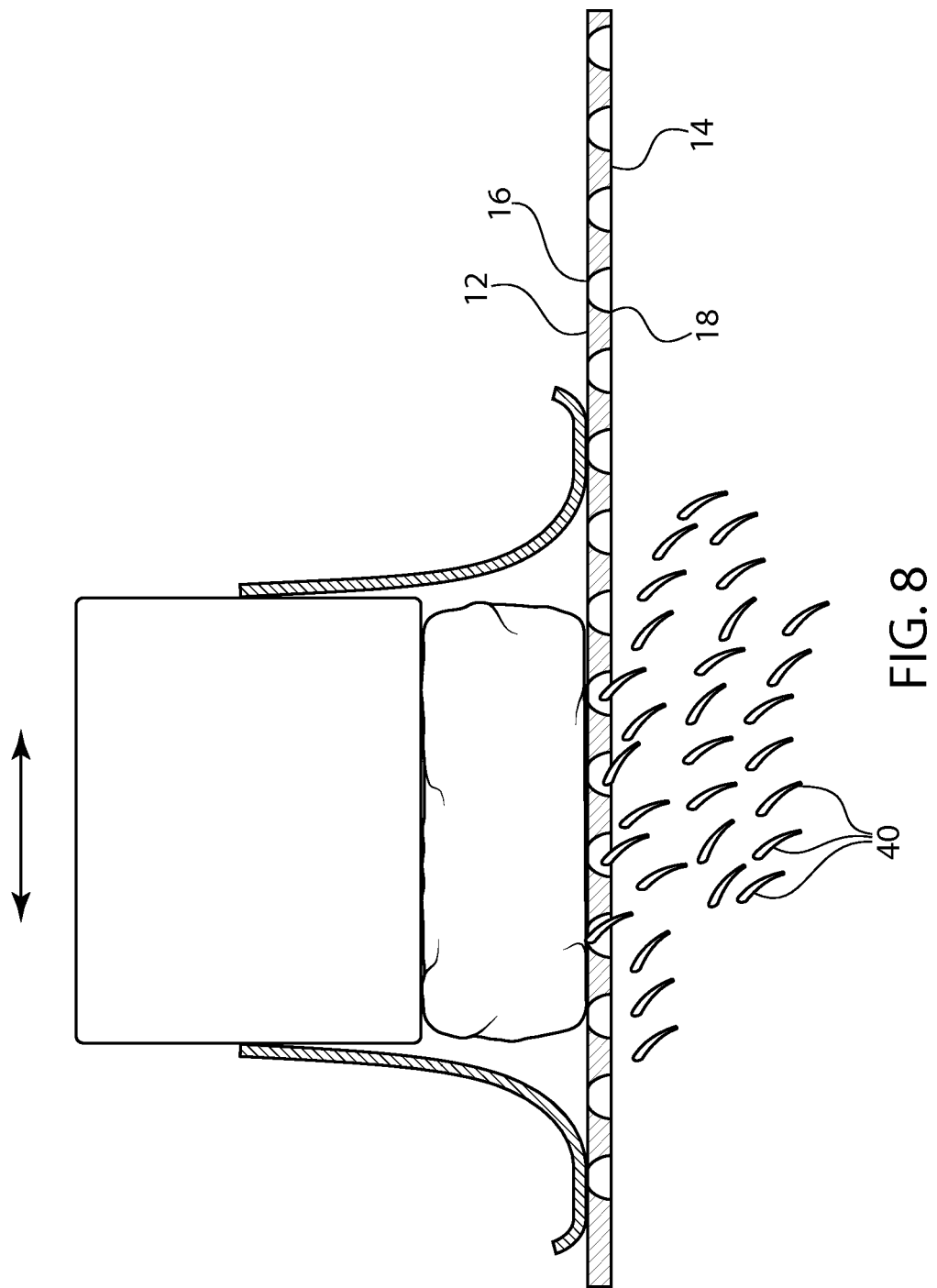

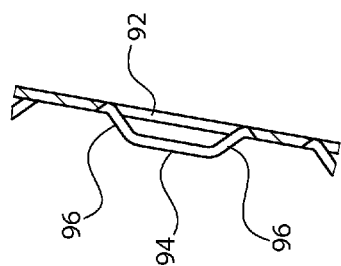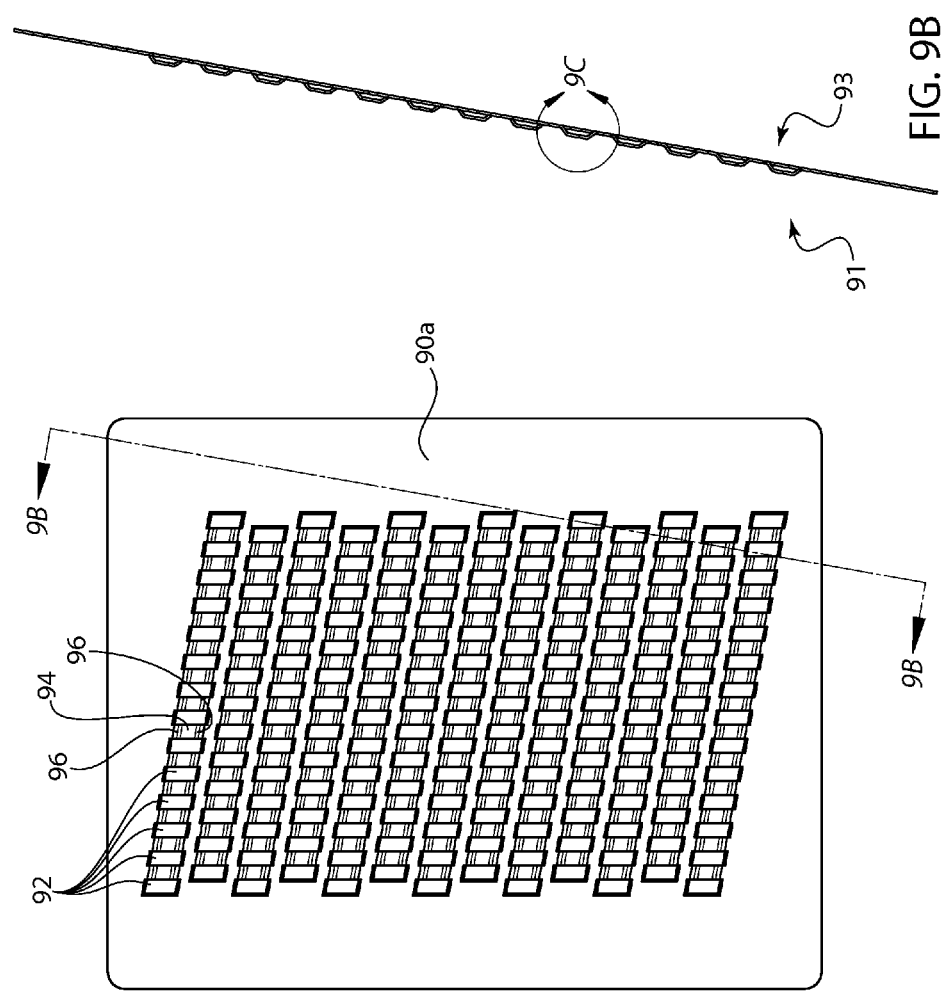

OPEN HOLE CUTTER/GRATER

CROSS REFERENCE TO RELATED APPLICATIONS

This application claims priority from U.S. Provisional Application Ser. No. 61/970,652 filed on Mar. 26, 2014 and U.S. Provisional Application Ser. No. 61/979,465 filed on Apr. 14, 2014, the entire contents of both provisional applications being incorporated herein by reference.

BACKGROUND

1. Technical Field

The present principles relate to cutters and graters. More particularly, it relates to a cutting blade for a grater and a method for using the blade to cut, peel, slice, grate, slash, graze or rip material from an object.

2. Discussion of Related Art

Graters are generally used in the housewares and food-service market to extract fine shavings from a variety of foods (e.g., fruits and vegetables). To date, all known graters use tines of some kind that protrude from the surface of the grater and are configured to operate in one direction.

In most instances, a hole is provided in the surface of the grater, and the tine projects outward from the hole such when a food product is passed over the tines in a specific cutting direction, the food product is "grated" by the tines and the "grated" food product passes through the hole onto the desired surface positioned under the grater.

Those of skill in the art will appreciate that there are several downfalls and disadvantages to these known grater designs. For example, a user who accidentally comes into contact with the tines of the grater can easily cut themselves, as these tines protrude from hole and therefore protrude from the plane of the cutting surface. Another disadvantage is that all known graters are configured for a one way cutting operation. Thus, when the food product is passed over the cutting tines in the cutting direction, the food product is grated. However, when the food product is passed over the tines in the opposite (non-cutting) direction, no grating of food cutting is performed.

SUMMARY

The "open hole" grater of the present principles is the first grater of its kind to enable the removal of food shavings without tines (i.e., the raised up tines or protrusions sometimes referred to as "spiky" material found in all other known graters). By replacing a grater's sharp tines with open holes, a significant reduction in manufacturing costs and labor hours is achieved for the manufacturer. It also operates to benefit the end user/consumer in many substantial ways. For example, open hole graters are a much more user friendly and safer product. That is, one could run their hand across the surfaces of the open hole grater without suffering and damage or cuts to their hand. Another benefit to the consumer is that the open hole grater collects a more finely sliced (i.e., cleaner) result than previous models of graters. Another benefit is that the grater has a longer life because grating can occur in both rubbing directions. Another benefit is that without a tine sticking up, one can grate the whole piece of food, and thus grate a more precise amount of food. With a tine that sticks up or protreudes, one can only grate a piece of food down to a thickness that matches the distance that the tine protrudes from the surface of the grater.

According to an implementation, the food grater includes a blade having an upper food engaging surface and a lower surface, and at least one open hole passing through the blade and extending from the upper surface to the lower surface. The at least one open hole is etched into the lower surface of the blade such that a predetermined cutting angle is formed between a plane of the upper surface and a point where the opening of the hole meets the same.

According to another implementation, the food grater includes a holder, a blade positioned within the holder having an upper food engaging surface and a lower surface. A plurality of open holes pass through the blade and extend from the upper surface to the lower surface. The plurality of open holes are etched into the lower surface of the blade such that a cutting angle is formed between a plane of the upper surface and a point where the opening of the hole meets the same, such that the upper surface remains void of any protrusions therefrom.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 8 is a side view in partial cross-section showing the operation of the open hold grater according to yet a further implementation of the present principles;

FIGS. 9A-9C show another different implementation of the open hole grating system according to the present principles;

DETAILED DESCRIPTION

The present principles are directed to food grating/cutting devices that can be hand held, mounted to a mandolin slicing device or attached to a machine.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
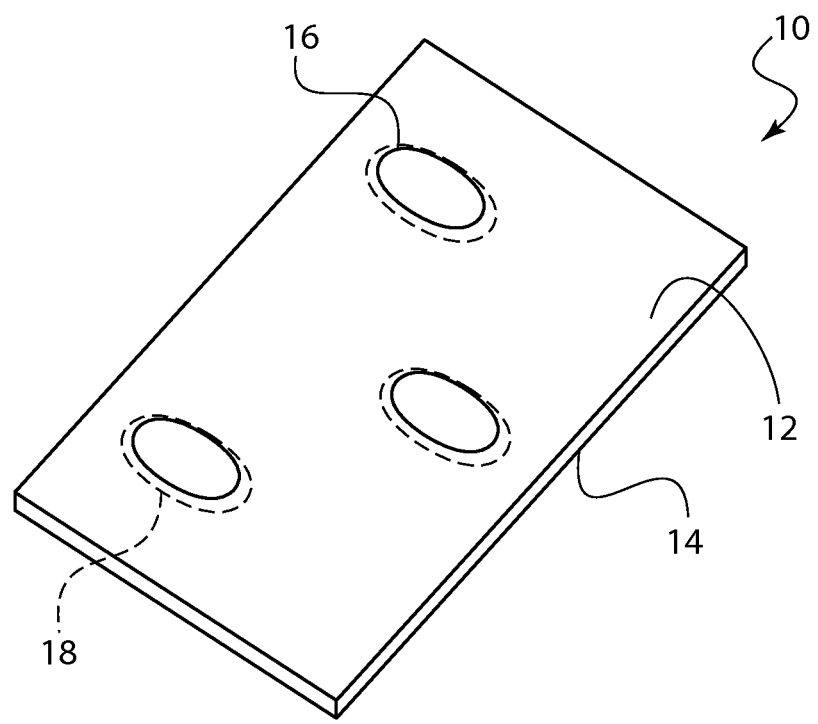
FIG. 1 is a perspective view of the open hole grating blade according to an embodiment of the present principles.
Figure 2A:
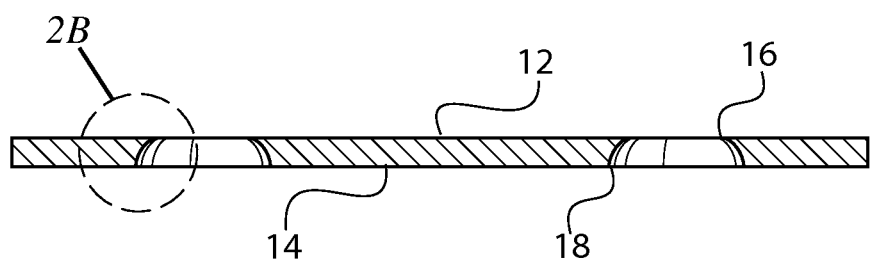
FIG. 2A is a cross-sectional view of the blade in FIG. 1, according to an embodiment of the present principles.
Figure 2B:
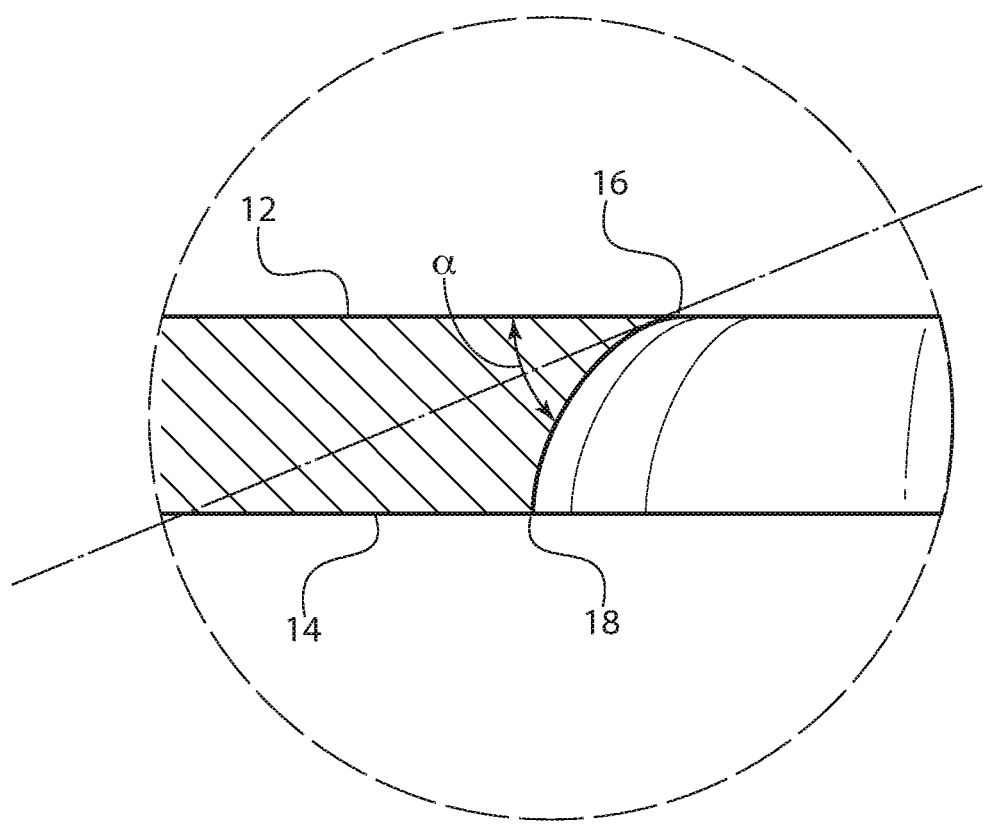
FIG. 2B is an enlarged area of FIG. 2A, according to an embodiment of the present principles.

As noted above, the present principles relate to a cutting blade (grater/cutter) and a method for using the blade to cut, peel, slice, grate, slash, graze or rip material from an object. The cutting blade includes an opening whose edge remains in the plane (flat or curved as desired) defined by the body of the blade that the opening lies in, and not a tine that protrudes out, away from the plane. Referring to FIGS. 1, 2A and 2B, there is shown a flat embodiment of the cutting blade 10 with an upper food engaging surface 12 defining the plane of the cutter and a lower opposite surface 14. A plurality of open holes 16 are positioned along the upper food engaging surface 12. On the opposite surface 14, the holes 18 are generally larger than the upper surface holes 16 such that a cutting angle α is formed between the plane of the upper surface 12 and the point 17 where the opening of the hole 16 meets the same. As shown in FIG. 2B, a radius of curvature r can be employed in the manufacturing/etching process of the holes such that the cutting blade formed by the junction between the upper place surface 12 and the opening of hole 16 can be accurately reproduced and provides the effective cutting/grating action as desired for the intended application. The cutting angle α can be selected according to a desired food preparation application for the grater 10. By way of example, cutting angle α can be in a range of, for example, 5-45 degrees.

Figure 3:
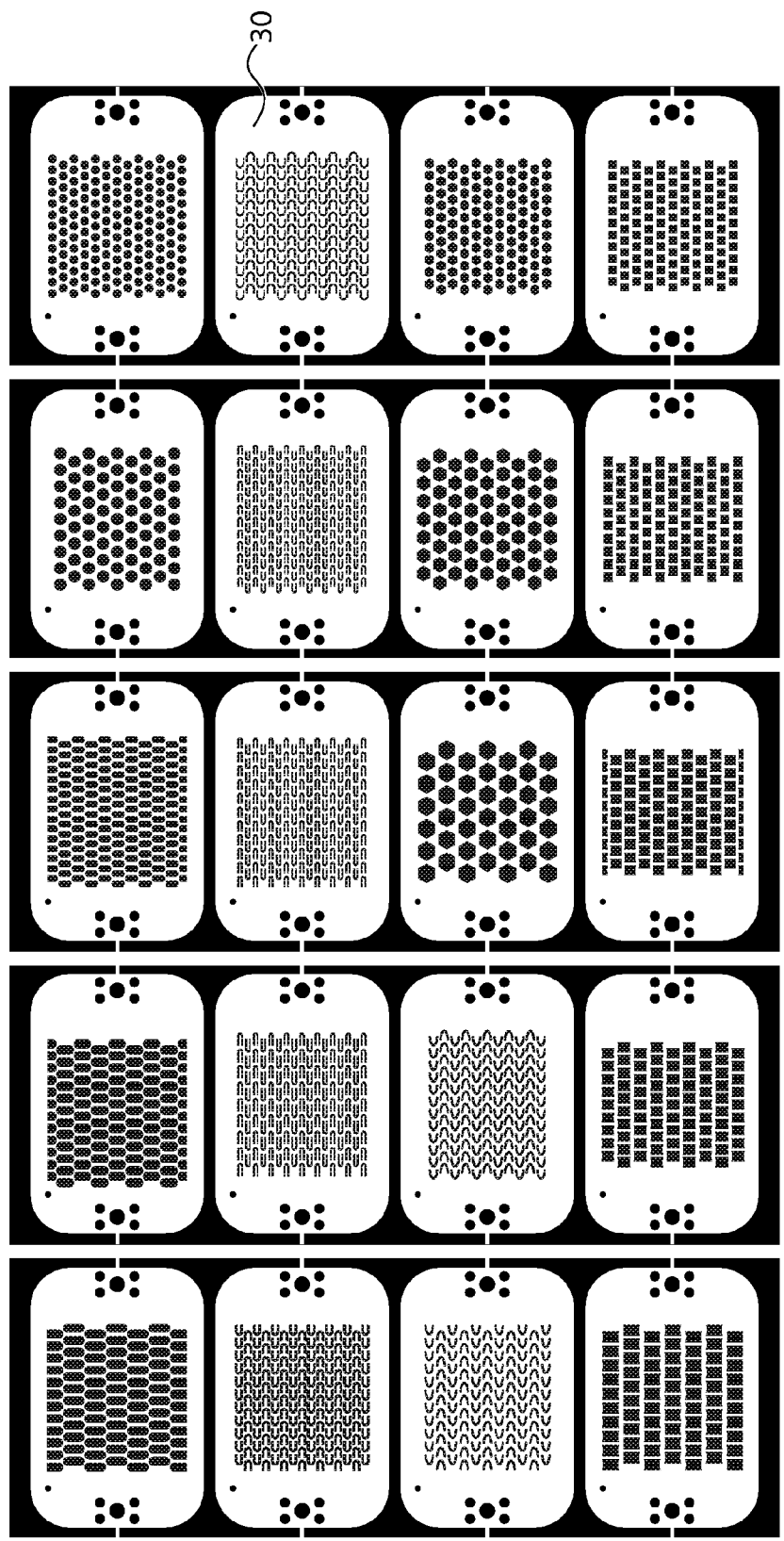
FIGS. 3 and 4 are views of multiple different implementations of the open hole grating blades, according to other embodiments of the present principles.
Figure 4:
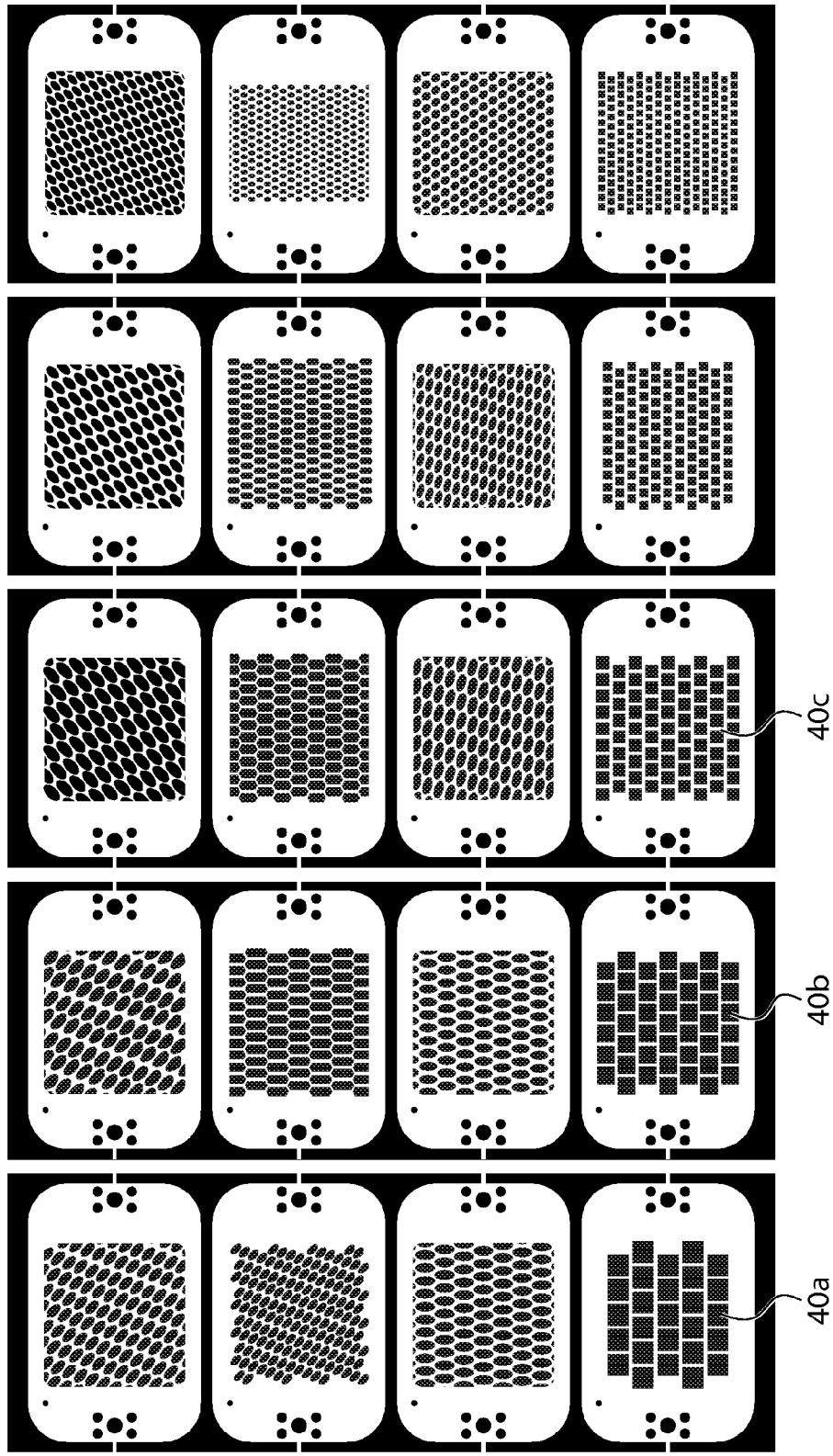

As will be appreciated by this disclosure, the openings or holes in the open hole grater of the present principles may have any desired shape. For example, see the exemplary shapes shown in FIGS. 3 and 4. In many instances the openings/holes can be round, oval or elliptical. In other instances, they may be wavy lines (30) or squares (40a-40c). In other implementations, they can be rectangular, parallelogram (76) or trapezoidal in shape (e.g., See FIG. 7).

In addition, the edge of the opening may have any desired configuration for removing material. For example, see the edges shown in FIG. 2. The opening performs a clean cutting action by allowing the contents, such as fruit or cheese, to press into the opening or gap and then be removed by the edges of the opening with a sliding or rubbing action.

Figure 5:
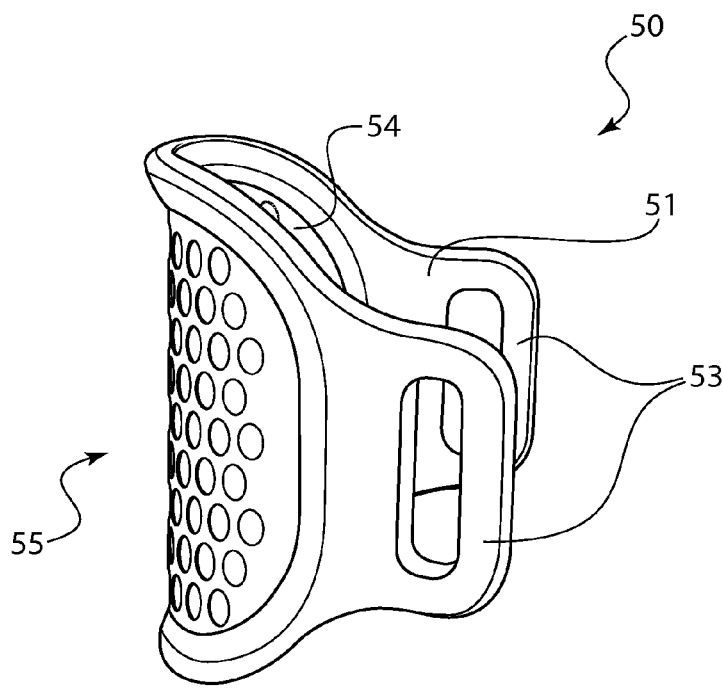
FIGS. 5 and 6 are perspective views of a curved embodiment of the open hole grater according to another implementation of the present principles.
Figure 6:
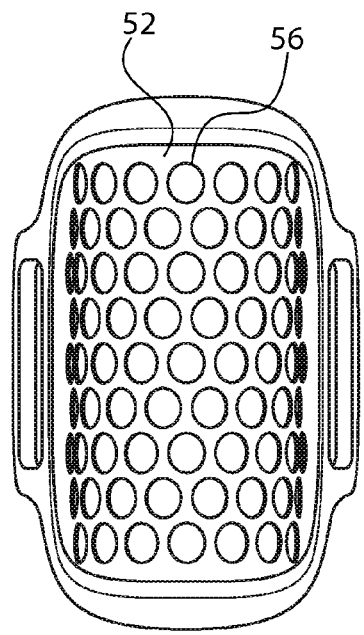

FIGS. 5 and 6 show a curved version 50 of the open hole grater according to the present principles. Here, the outer surface 52 of the blade 55 includes a plurality of holes 56 etched into the blade as shown in FIG. 2A. A support frame 51 retains the blade 55 and can include handles 53 configured for handheld use or for connection to a machine or apparatus used to grate food products. Those of skill in the art will appreciate that as the blade 55 is bent along an arc, the peripheral edges of the holes are bent back, recessing them relative to the place of food grating. Thus, the center point of the arc formed in blade 55 is then the point most in contact with the food, thereby creating higher surface pressure which leads to the result of a more effective cutting blade, while not having any protruding tines or surfaces.

As will also be appreciated, all points along the hole at the center point of the art are along the same vertical plane. Thus, the top of a cutting hold 56 is not exposed more relative to the bottom of the same hole in the bent configuration than it is in the flat configuration.

Figure 7:
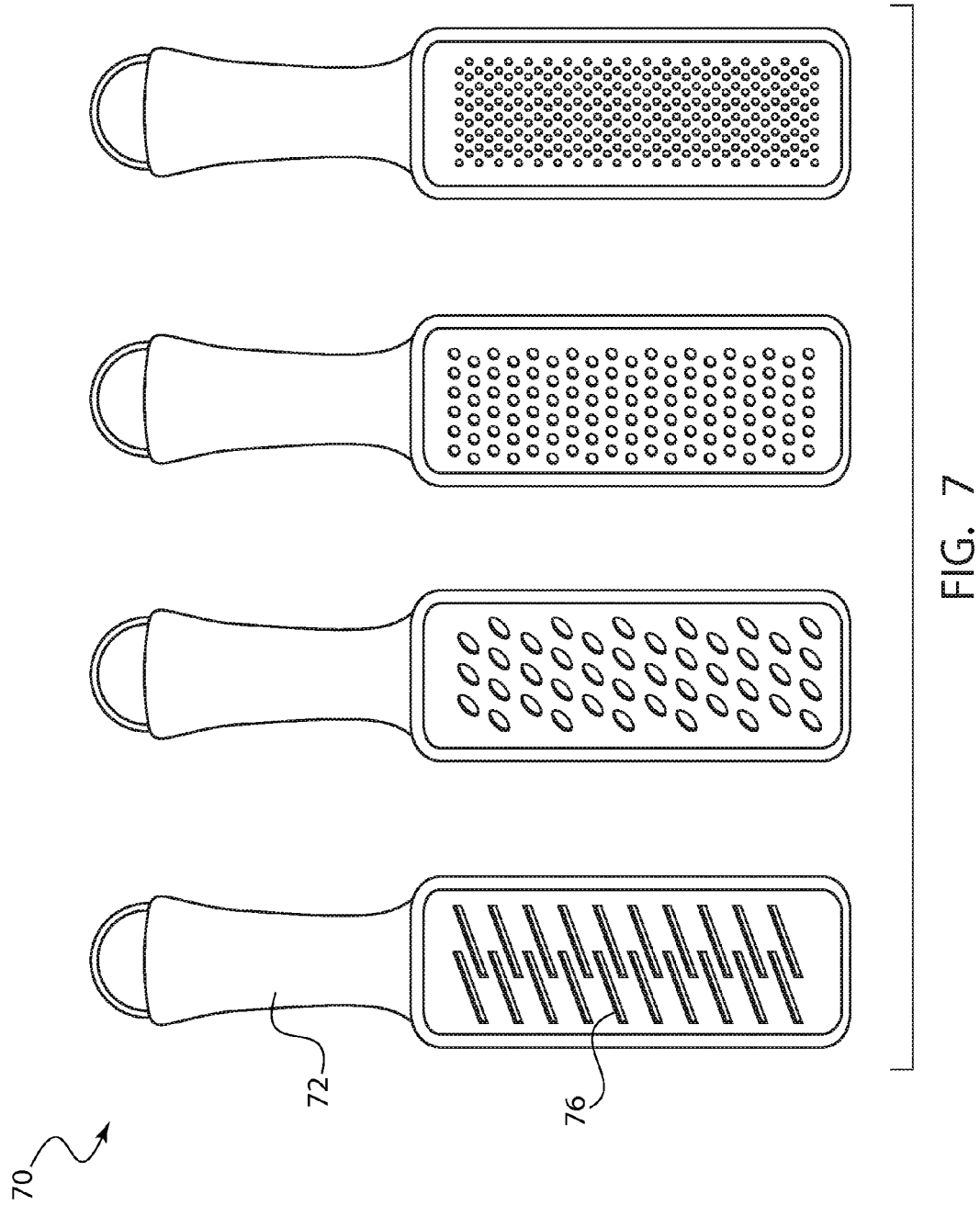
FIG. 7 shows other views of yet additional different implementations of the open hole grating system according to the present principles.

FIG. 7 shows four different implementations of the open hole grater 70 according to the present principles. In one implementation configured for clean peels of fruits, vegetables, chocolates or cheeses or any other food product, parallelogram shaped hopes 76 are provided. In another implementation referred to as a large grater the open holes 74 are oval in shape and are configured for cutting clean strips of fruits, vegetables, chocolates or cheeses or any other food product. Another implementation is referred to as a grater/zester and is shown with open circular holes 75 which are configured to cut clean chips of, for example, citrus, chocolates and cheeses. For "zesting" only and providing smaller cut clean chips, a smaller open hole configuration 77 can be implemented.

Referring to FIG. 8 there is shown another implementation of the open hole grater 10 according to the present principles. In this implementation, the grater 10 is flat and pushing device 80 is used to assist in the back and forth motion for grating the food product 82.

As shown and mentioned above, with the open hole grater 10 of the present principles, food can be grated in both directions across the plane of the same. This increases efficiency and speed during food preparation, and makes for a more convenient operation.

Figure 10C:
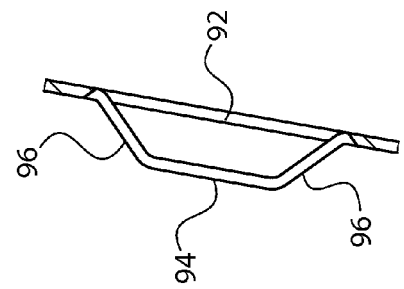
FIGS. 10A-10C show yet further implementation of the open hole grating system according to the present principles.
Figure 10B:
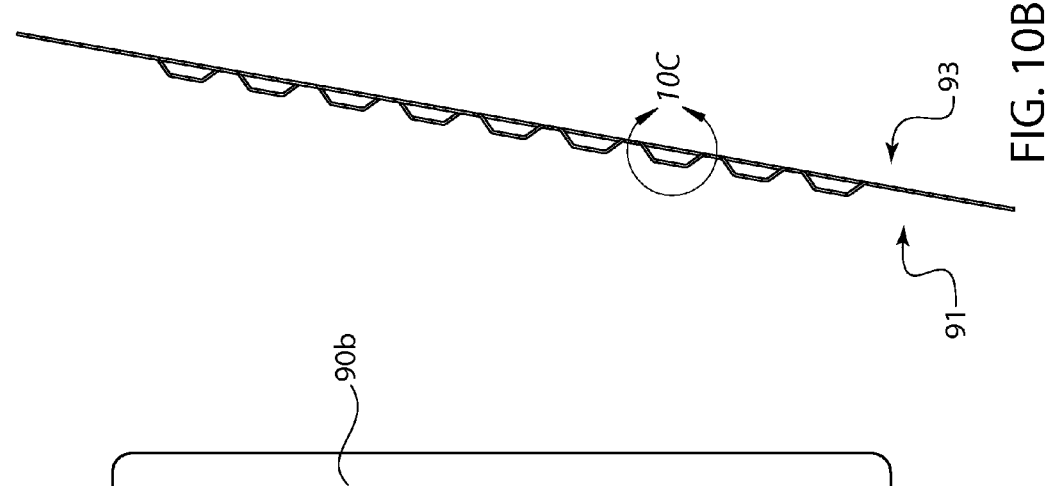
Figure 10A:
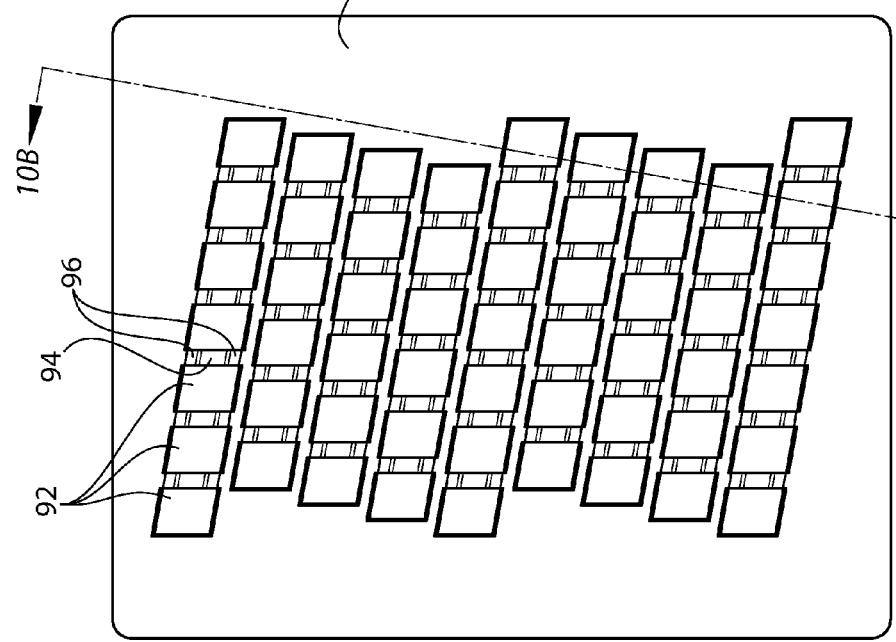

FIGS. 9 and 10 show alternative implementations of the open hole cutter/grater of the present principles. In these embodiments, the holes include ridges interrupting the same. As shown, a plurality of open holes 92 are arranged on the sheet 90A or 90B. The open holes 92 are interrupted by ridges 94 having transition portions 92. As shown in the respective FIGS. 9B, 9C and 10B and 10C, in this manner, the open holes 92 are interrupted such that a second plane is defined by the upper surface of the ridge 94 (i.e., second plane as compared to the above described embodiments where the open hole is maintained in the same (first) plane as the food engaging surface). Thus, in these implementations, the food engaging surface will be defined by the ridges 94, while still maintaining the open hole construction with no protrusions or tines extending therefrom.

As shown in FIGS. 11-14, the blade can be configured as desired to create cuts of various shapes and dimensions, such as thin ribbons, thick curly spirals, or squared flat noodle-like strips. The specific location of bends in each of the blades' bodies in conjunction with the position of each of the blades' cutting allow the blade to cut a desired amount of material from an object as the object is brought into contact with—and moved across—the face of the blade.

Figure 11A:
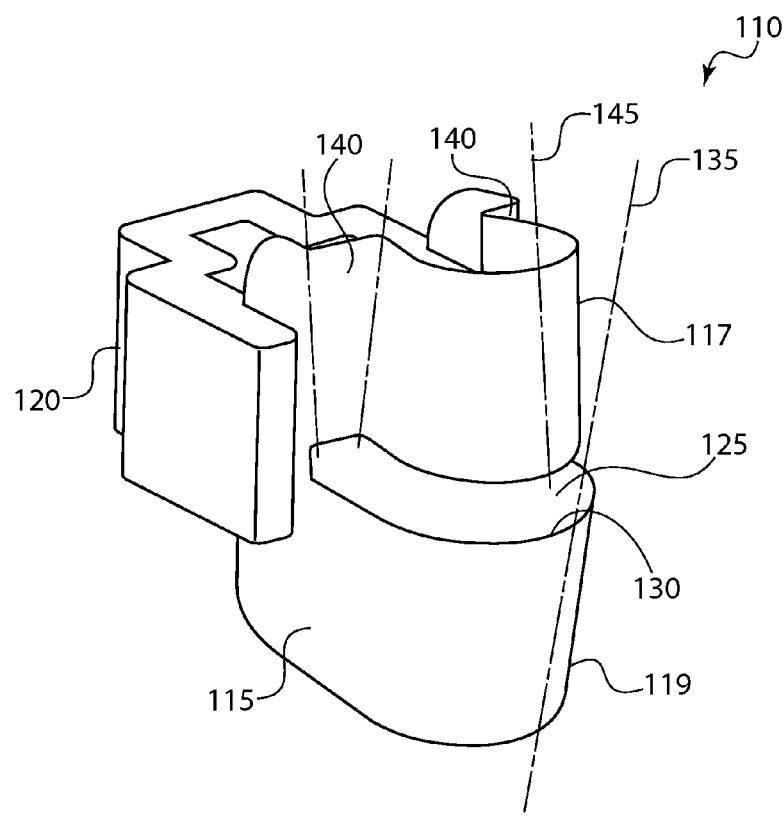
FIG. 11A is a perspective view of a blade according to another embodiment of the present principles.

Referring to FIG. 11A, a blade 110, according to an embodiment of the invention, comprises a blade body 115 and a blade mount 120. The blade body 115 may be constructed of any desired material, for example, stainless steel, another metal alloy, and/or plastic. The blade body 115 includes a top portion 117 and a bottom portion 119 that includes an edge 130 configured to remove material from an object such as a fruit or vegetable from the surface of the object to a controlled depth from the surface. The top portion 117 includes one or more bends 140 that cause the top portion 117 to be offset from the bottom portion 119 to generate the opening 125. The opening 25 exposes the edge 130 for cutting and defines the depth of the material removed from the object. In this and other embodiments, the top portion 117 is tilted relative to the bottom portion 119 (angle between the two axes 135 and 145) to allow an object to more easily feed into the opening 125 and onto the edge 130.

Figure 11B:
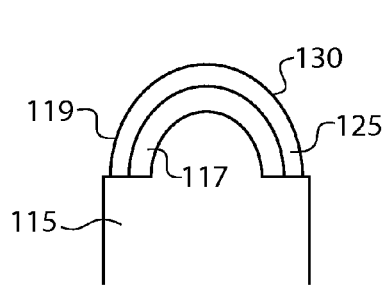
FIG. 11B is a top view of a portion of the blade shown in FIG. 11A, according to an embodiment of the present principles.
Figure 11C:
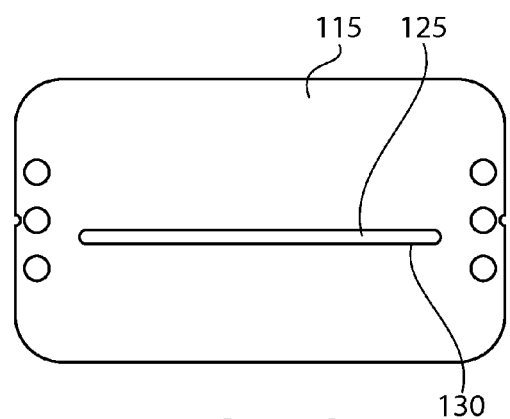
FIG. 11C is a view of a blank of the blade shown in FIG. 11A, according to an embodiment of the present principles.

FIG. 11B shows a top view of the blade body 115 wherein the top portion 117 is tilted relative to the bottom portion 119. FIG. 11C shows a blank used to form the blade body 115 shown in FIG. 11A. Using the configuration of a blade body as shown in FIG. 11, the blade 110 can be used to peel and cut an object, such as an apple, wherein a thin strip of the outermost layer is removed and the inner portion of the food product is cut in a spiral pattern.

Referring again to FIG. 11A, the blade 110 includes a blade mount 120. The blade mount 120 is configured to support a blade body 115 and to releasably secure the blade body 115 to a hand operated or electric device. The device is configured to hold a blade and to hold an object to be sliced or peeled by the blade. The device continuously and rotationally moves the object over the cutting surface of the blade body to slice or peel the object.

Figure 12A:
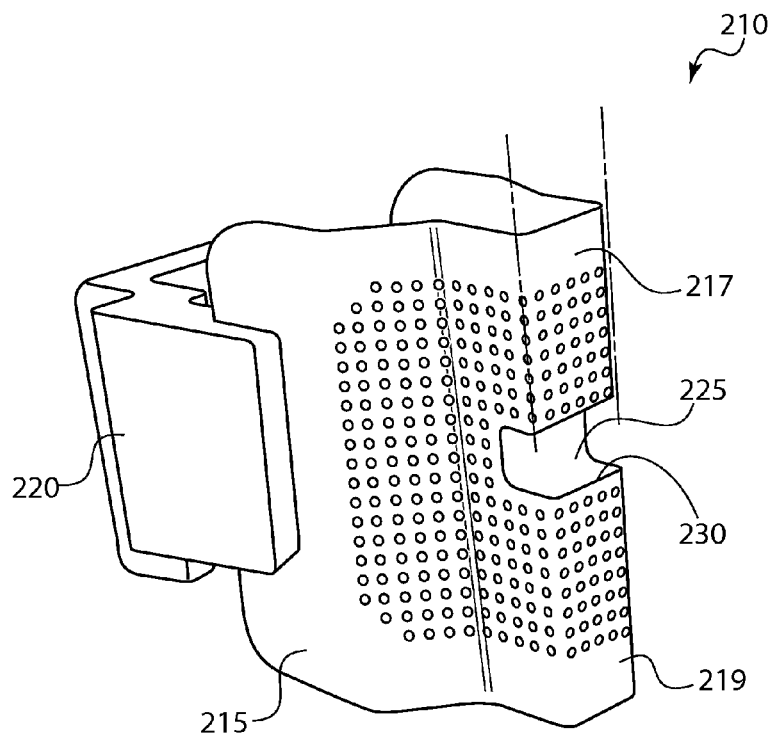
FIG. 12A is a perspective view of a blade according to another embodiment of the present principles.
Figure 12B:
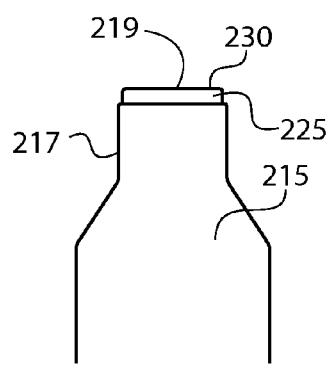
FIG. 12B is a top view of a portion of the blade shown in FIG. 12A, according to an embodiment of the present principles.
Figure 12C:
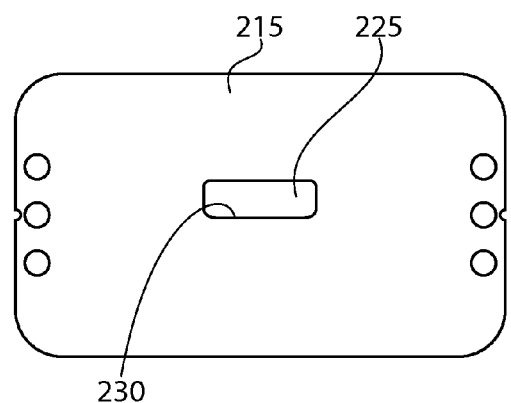
FIG. 12C is a view of a blank of the blade shown in FIG. 12A, according to an embodiment of the present principles.

Referring to FIG. 12A, a blade 210, according to another embodiment of the invention, comprises a blade body 125 and a blade mount 220. Here, the blade body 215 includes a top portion 217 that has a flat section that is wider than the flat section of the bottom portion 219. This configuration creates an offset projecting the cutting edge 230 of the opening 225 outward to cut a controlled depth into an object, such as a fruit or a vegetable. The configuration of the blade shown in FIG. 12A allows vegetables or other objects to be continuously cut into flat squared shapes similar to fettuccine noodles. FIG. 12B shows a top view of the blade 210 with the edge 230 offset from the top portion 217. FIG. 12C shows a blank used to form the blade body 215 shown in FIG. 12A.

The blade 210 also includes a plurality of holes 229 whose size and position in the top portion 217 and the bottom portion 219 allow one to bend the top portion 217 differently than the bottom portion 219 without generating much stress in the a top and bottom portions 217 and 219. In this and other embodiments, the blade 210 includes many circular holes 229 each having a diameter of about 0.1 inches, and evenly distributed throughout top and bottom portions 217 and 219 of the blade. In other embodiment more or fewer holes may be used in one or both of the portions 217 and 219.

Figure 13A:
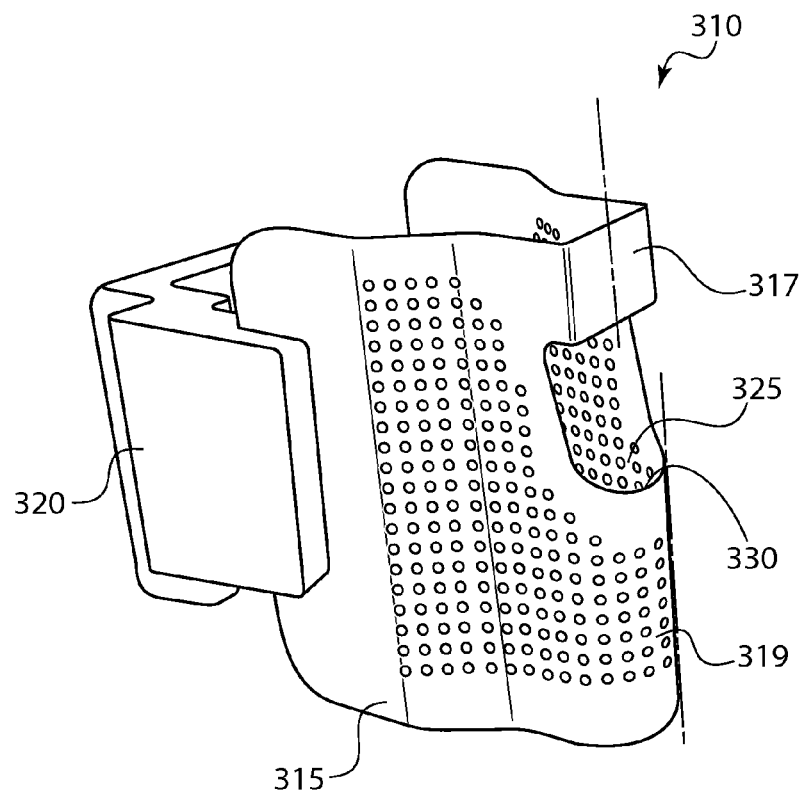
FIG. 13A is a perspective view of a blade according to another embodiment of the present principles.
Figure 13B:
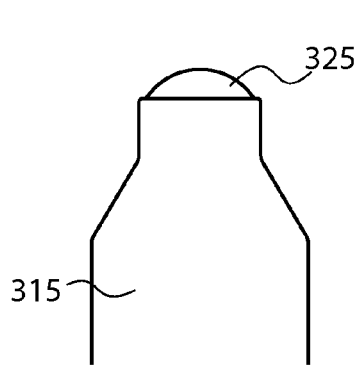
FIG. 13B is a top view of a portion of the blade shown in FIG. 13A, according to an embodiment of the present principles.
Figure 13C:
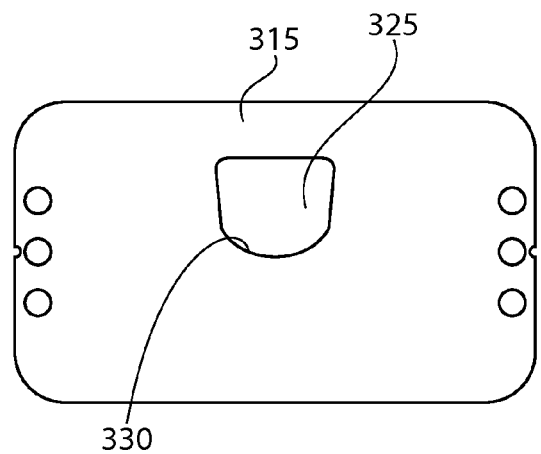
FIG. 13C is a view of a blank of the blade shown in FIG. 13A, according to an embodiment of the present principles.

Referring to FIG. 13A, a blade 310, according to yet another embodiment of the invention, comprises a blade body 315 and a blade mount 320. The blade body 315 includes a top portion 317 and a bottom portion 319 that includes an edge 330. Here, the blade 310 is configured to cut vegetables or other objects into thick strips, for example, curly fries. FIG. 13B shows a top view of the blade 310 with the edge 330 offset from the top portion 317. FIG. 13C shows a blank used to form the blade body 315 into the configuration shown in this embodiment.

Figure 14A:
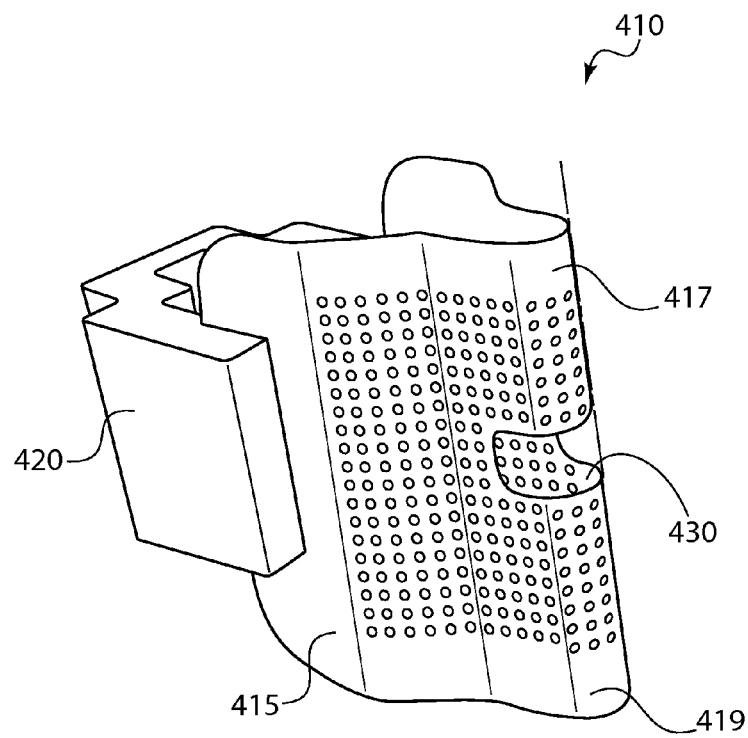
FIG. 14A is a perspective view of a blade according to yet another embodiment of the present principles.
Figure 14B:
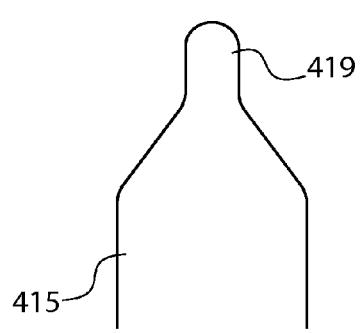
FIG. 14B is a top view of a portion of the blade shown in FIG. 14A, according to an embodiment of the present principles.
Figure 14C:
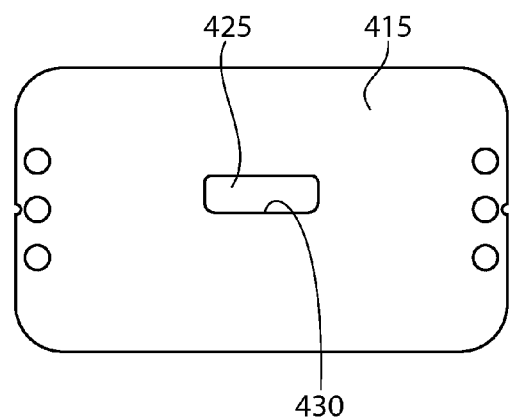
FIG. 14C is a view of a blank of the blade shown in FIG. 14A, according to an embodiment of the present principles.

Referring to FIGS. 14A and 14B, a blade 410, according to yet another embodiment of the invention comprises a blade body 415 and a blade mount 420. The blade body 415 includes a top portion 417 and a bottom portion 419 that includes an edge 430. Here the top portion 417 matches the bottom portion 419, i.e. the edge 430 is not offset from the top portion 417, and the width of the cutting portion of edge 430 is less than width of the blades 410 shown in the other figures. FIG. 14C shows a blank used to form the blade body 415 into the configuration shown in this embodiment. In this and other embodiments, the blade is configured to remove a ribbon of material from the surface of an object such as a lemon.

In another aspect of the invention, a method for producing a blade is provided. In certain embodiments, the method includes cutting or manufacturing a blade body in a desired pattern that includes a blade opening, forming the blade body to bend the blade opening in a desired configuration, forming the face of the blade with desired bends to create a desired shape, and securing the blade body to a blade mount.

In certain embodiments, a method of making a blade includes cutting a metal sheet or other material into the desired blank. FIGS. 11C, 12C, 13C, and 14C show examples of such blanks used to form a blade body 115, 215, 315 and 415, respectively. The blank may be formed using any desired means, such as photochemical etching, laser cutting, stamping, punching, water-jet cutting, electrical discharge machining or other desired cutting methods. In certain embodiments, the preferred method for cutting a blank is photochemical etching. In other embodiments, other manufacturing methods may be used to create a blade body in a desired shape, for example injection molding, investment casting, die casting, metal injection molding, liquid metal, forging, or other desired methods.

After a desired blade body blank has been formed, the blade body is bent to form the top and bottom portions 117, 217, 317, 417 and 119, 219, 319, 419 of the blade body, respectively. The specific bends are configured to work in conjunction with a desired edge 130, 230, 330, 430 and blade opening 125, 225, 335, 435 configuration. One or more additional bends may be made on the face of the blade body to create a vertical or horizontal offset surrounding the blade opening. After the blade body 115, 215, 315, 415 has been formed, a blade mount 120, 220, 320, 420 is attached to the blade body 115, 215, 315, 415. In certain embodiments, the blade mount 120, 220, 320, 420 can be overmolded with an injection molding process to attach the mount 120, 220, 320, 430 to the blade body 115, 215, 315, 415. In other embodiments, other desired methods of manufacturing and attaching the blade mount 120, 220, 320, 420 to the blade body 115, 215, 315, 415 may be used.

Reference in the specification to "one embodiment" or "an embodiment" or "an implementation" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A food grater comprising:
    a blade having a food engaging surface and an opposing surface; and
    at least one open hole passing through the blade and extending from the food engaging surface to the opposing surface, said at least one open hole being etched into the opposing surface of the blade such that the food engaging surface remains void of any protrusions, and a predetermined cutting angle in a range of 5-45 degrees is formed between a plane of the food engaging surface and a point where the opening of the hole meets the same.

2. The food grater of claim 1, further comprising a handle connected to and configured to hold the blade, said handle enabling hand held use of the grater.

3. The food grater of claim 2, wherein said blade is substantially flat.

4. The food grater of claim 2, wherein said blade is curved.

5. The food grater of claim 1, further comprising a frame connected to the blade, said frame being configured for connection to a machine for machine use of the grater.

6. The food grater of claim 5, wherein said blade is curved.

7. The food grater of claim 1, wherein said at least one open hole comprises a plurality of open holes.

8. The food grater of claim 7, wherein one of said plurality of open holes is shaped differently than the others of said plurality of open holes to provide predetermined cutting shapes.

9. The food grater of claim 1, wherein said at least one open hole has a geometric shape of a circle, an oval, an ellipse, a rectangle, a square or a parallelogram.

10. The food grater of claim 1, wherein said food engaging surface includes one or more ridges, said one or more ridges passing through the at least one hole such that a portion of the open hole is raised with respect to other portions of the same open hole.

11. A food grater comprising:
    a holder;
    a blade positioned within said holder and having an upper food engaging surface and a lower surface; and
    a plurality of open holes passing through the blade and extending from the upper surface to the lower surface, said plurality of open holes being etched into the lower surface of the blade such that a cutting angle in a range of 5-45 degrees is formed between a plane of the upper surface and a point where the opening of the hole meets the same such that the upper surface remains void of any protrusions therefrom.

12. The food grater of claim 11, wherein said plurality of open holes have a geometric shape of a circle, an oval, an ellipse, a rectangle, a square or a parallelogram.

13. The food grater of claim 12, wherein at least one of said plurality of open holes is shaped differently than the others of said plurality of open holes to provide predetermined cutting shapes.

14. The food grater of claim 12, wherein a group of said plurality of open holes are shaped differently than another group of said plurality of open holes.

15. The food grater of claim 11, wherein said blade is substantially flat.

16. The food grater of claim 11, wherein said blade is curved.

17. The food grater of claim 11, wherein said holder is configured to allow hand held use of the grater.

18. The food grater of claim 11, wherein said holder is configure to mount the grater to a machine for use.

19. A Food grater comprising:
    a blade having a food engaging surface and an opposing surface; and
    at least one open hole passing through the blade and extending from the food engaging surface to the opposing surface, said at least one open hole being etched into the opposing surface of the blade such that the food engaging surface remains void of any protrusions, and a predetermined cutting angle is formed between a plane of the food engaging surface and a point where the opening of the hole meets the same, said food engaging surface having one or more ridges, said one or more ridges passing through the at least one hole such that a portion of the open hole is raised with respect to other portions of the same open hole.

* * * * *